United States Patent Office 3,305,407
Patented Feb. 21, 1967

3,305,407
DIP BRAZING COMPOSITION
Ronald D. Koeplinger, Saginaw, Mich., assignor to The Dow Chemical Company, Midland, Mich., a corporation of Delaware
No Drawing. Filed June 3, 1964, Ser. No. 372,406
6 Claims. (Cl. 148—24)

This invention relates to dip brazing and more particularly relates to a new and novel, low melting, dip brazing mixture for use in joining brazeable magnesium base alloys.

Conventionally in dip brazing operations, component parts of, for example, magnesium alloy fabrications or assemblies to be brazed, that is, to be joined by flowing a thin layer (capillary thickness) of a nonferrous filler metal or alloy into the space between them, are held together while a strip, wire, or paste of a brazing mixture or composition containing a filler metal, a flux binder and a carrier, applied so as to conform to the joint to be brazed, is placed thereon. The entire assembly is then preheated from about 800 to about 900° F. and the so-heated unit immersed in a flux bath maintained at a temperature range of from about 1075° F. to about 1130° F. at which the filler alloy melts and flows into the joint, without melting the article to be brazed. After, for example, about a minute and a half the unit is removed from the flux bath and cooled at least to a temperature whereupon the filler material solidifies to join the parts into a rigid unit.

In conventional practice, magnesium-base materials, nominally comprising, for example, about 12 percent by weight aluminum, about 5 weight percent of zinc, and about 0.3 percent manganese, balance magnesium, are used as a filler material in brazing mixtures in the joining of brazeable magnesium or aluminum base parts. In using these particular brazing (filler) alloys, the minimum brazing temperature is about 1080° F. This and other known filler alloys, therefore, are limited in use because their melting temperatures in many cases exceed those of the articles or parts desired to be brazed. Accordingly, temperature control is very critical. Moreover, some configurations cannot be brazed because the base metal to be joined does not have, for example, enough strength at the brazing temperature to hold its shape.

It is a principal object of the present invention, therefore, to provide a new and novel filler alloy composition for use in joining brazeable magnesium base articles or parts together, which essentially overcomes the disadvantages aforesaid encountered in brazing mixtures, containing convention filler alloy materials.

These and other objects and advantages will become apparent from the detailed description presented hereinafter.

The novel brazing mixture of the present invention comprises (1) about 8 parts by volume of a novel filler alloy composition, preferably in pelleted form, consisting by weight essentially of about 1.5–2.5% aluminum and about 52.5 to 57.5% zinc, balance magnesium, together with (2) from about 0.75 to about 6.0 parts by volume of a particulated flux binder and, (3) sufficient liquid carrier to form the binder and filler into a paste or slurry consistency. The pellets of the filler metal used in the above brazing mixture as a maximum are about −60 mesh in size (U.S. Standard Sieve Series) and preferably about −80 mesh in size. Pellets greater in size than aforesaid cause the undesirable result of allowing the paste mixture to fall from the brazement in preheating.

The term "magnesium" as used herein means the pure metal, commercially available primary magnesium such as, for example, so-called cell magnesium, containing the normal impurities or in certain cases magnesium base alloys suitable for use in preparing the present novel filler alloy of the present invention.

The terms "zinc" and "aluminum" as used herein mean the pure metal, commercially available primary zinc and aluminum metal containing the normal impurities or zinc and aluminum base alloys suitable for use as the zinc or aluminum component of the present novel filler alloy of the present invention.

The filler alloy compositions used in the above brazing mixtures, as specified, flow for example at about 925° F., thus, well below the melting point of most of the more commercially important magnesium and aluminum base alloys.

The flux (high temperature) binders mentioned aforesaid for use in the present brazing mixtures of the invention melt or are at least semi-molten at temperatures of from about 727° F. to about 892° F., thus are suitable for the preheating operation in dip brazing methods. Such a flux which may be used and which is preferable in a flux binder having by weight the nominal composition: 55 percent KCl, 34 percent $MgCl_2$, 9 percent $BaCl_2$, and 2 percent $CaF_2$, hereinafter designated as No. 470 binder. Other flux binder compositions such as, for example, those set forth in Table I below may also be used and have been found to promote the formation of good fillets and acceptable metal flow.

TABLE I

| Nominal Composition by Weight, Percent | | | | | Melting Point, °F. |
|---|---|---|---|---|---|
| KCl | $MgCl_2$ | $BaCl_2$ | $CaF_2$ | NaCl | |
| 62 | 38 | | | | 810–815 |
| 18 | 58 | 24 | | | 865–892 |
| 17 | 54 | 7 | | 22 | 727–774 |
| 53 | 34 | 12 | 1 | | 788–804 |
| 56 | 37 | 6 | 1 | | 792–806 |

Preferably, the particulated binding material will be as a maximum about 20 mesh in size (U.S. Standard Sieve Series), as brazing mixtures prepared from coarser particles of binder do not readily adhere to the brazement while preheating the parts to be joined. Preferably, the flux binder particles should be from 60 to 230 mesh in size or smaller.

The liquid carrier for combining the flux binder and filler alloy into a paste consistency can be any material which (a) is liquid at room temperature, (b) is substantially chemically inert to the mix components, (c) does not promote reaction between the binder and filler (d) has a boiling point below about 500° C., (e) will undergo little or no carbonization in the preheat furnace and which (f) does not volatilize rapidly at room temperature. In practice, the carrier acts as a low or room temperature binder material.

Carrier liquids suitable for use in the present invention are preferably organic and are selected from the group which includes aromatic hydrocarbons, e.g., benzene; alkyl-aryl hydrocarbons, e.g., toluene and xylene; chlorinated aliphatic and aromatic hydrocarbons, e.g., carbon tetrachloride, perchlorethane, chlorobenzene; aliphatic hydrocarbons, e.g., decane, octane; mineral spirits, kerosene, symmetrical and mixed ethers, ketones and other oxygen containing organics; carbon disulfide, and the like. Mineral spirits, however, is a very desirable carrier as it has a low volatilization rate at room temperature and does not excessively carbonize.

The amount of liquid carrier to be used is not critical but will be an amount to provide a slurry or preferably a paste when admixed with the binder and pellets. Ordinarily, the brazing composition as prepared will contain from about 20 to about 35 percent by weight of the carrier, based on the combined weights of the binder and pellets. Preferably, the carrier will be about 25 percent of the binder and pellet composition weight. For thin consistencies, the larger amounts of carrier will be used while for thicker pastes smaller amounts of the carrier will be incorporated into the brazing mixture, as is understood by those skilled in the art.

The brazing mixture of the present invention is used primarily for dip brazing of most magnesium base alloys, which include, for example, AZ10A, AZ31B, ZE10A, M1A, ZK60A, and ZK21A (A.S.T.M. designated nomenclature).

In general, the dip brazing process using the novel low melting brazing mixture of the present invention comprises: (1) cleaning and degreasing the magnesium base alloy parts to be joined by brazing, (2) assembling the clean parts so as to provide a capillary like spaced joint between said parts, e.g., about 0.01 to .015 of an inch, (3) applying the present novel brazing mixture to the joint so-formed, (4) preheating the assembly to a temperature of from about 825° F. to about 850° F., (5) immersing the preheated assembly in a molten flux bath having a temperature of from about 900° F. to about 1000° F. and, (6) removing the assembly, allowing it to cool at least sufficiently to solidify the filler alloy of the brazing mixture, whereupon, if necessary, the so-brazed article may be cleaned such as, for example, by washing and/or a slight etching treatment.

Any of the conventional cleaning compositions or methods suitable may be used to clean the parts prior to brazing. Similarly, conventional jigs, fixtures, or other holding means may be used to secure the parts during brazing. The assembly ready for brazing is preheated, for example, by means of a gas-fired or electrically heated furnace. Immersion time in the flux bath may vary, for example, from about 30 seconds to about 3 minutes, depending on the mass of the parts to be brazed. Post-braze cleaning is carried out using methods for cleaning and chemically treating the brazed assembly as known to one skilled in the art.

With respect to the amount of brazing mixture to be used, only enough is employed to provide a uniform resulting fillet. Large excesses of mix are desirably avoided. The mix is applied conventionally by brush, or spatula, or possibly by extrusion from a tube, and the like.

The following examples will serve to further illustrate the present invention, but are not meant to limit it thereto.

*Example 1.*—Pellets of −80 to +325 mesh of the instant novel filler alloy (nominal composition 2% Al, 55% Zn, balance of cell magnesium) were mixed with −100 to +200 mesh No. 470 flux binder and sufficient mineral spirits (U.S.P. grade) to make a thick paste, to prepare a number of brazing mixtures in accordance with the invention over the range of about 8 parts by volume pellets to from about ¾ to about 6 parts by volume flux.

An inverted T-shaped assembly was fabricated for joining purposes by tack welding the end corners of a 2″ long ½″ wide by ⅛″ thick piece of ZE10A magnesium base alloy (as the vertical leg of the T) centrally along the transverse axis of a 2″ square, ⅛″ thick ZE10A plate such to provide a clearance of about 0.01 inch between the plate and vertical leg. All surfaces to be brazed (i.e., either or both sides of the vertical leg at the 0.01 inch spaced joint) were sanded with No. 320 grit Aloxite (abrasive) cloth and further abraded with steel wool. A layer of the present brazing paste mixture prepared as above was brushed onto the joints at the junction of the vertical leg with the plate.

In a vertical position so as to maintain the flux in position till it became molten, the assembly was preheated in an electric pot furnace to about 825° F. until the flux binder in the mixture became molten (the mineral spirits having evaporated or burned off). The assembly then was removed from the pot and immersed in a molten bath of No. 452 flux (nominal composition being 42.5% KCl, 10% NaCl, 37% LiCl, 10% NaF and 0.5% AlF$_3$·3NaF) for about 1½ minutes maintained at a temperature of about 925° F. Upon removal of the T samples from the bath they were allowed to cool to about 600° F., quenched in cold water, and then immersed in boiling water for several minutes to remove adhering flux residues and examined as to the quality of fillets resulting and were found to be satisfactory in all cases. These results are presented in Table II which follows:

TABLE II

| Run No. | Pellet-to-Flux Binder Ratio | Results | |
|---|---|---|---|
| | | T Sample | Horizontal Flow |
| 1 | 8–¾ | Small fillets (But acceptable). | Good fillets. |
| 2 | 8–1½ | Good fillets | Do. |
| 3 | 8–2¼ | do | Do. |
| 4 | 8–3 | do | Do. |
| 5 | 8–3¾ | do | Do. |
| 6 | 8–4½ | do | Slightly small but acceptable. |
| 7 | 8–5¼ | do | Do. |
| 8 | 8–6 | do | Small fillets but acceptable. |

*Example II.*—Similarly as in Example I the same paste composition and pellet-to-binder ratios were applied to test specimens also of ZE10A comprising a 2″ square plate having centrally located thereon a partially curved vertical leg ½″ high and ⅛″ thick also spaced 0.01 inch from the plate. Only the concavical juncture of the leg and plate, however, was provided with the brazing mixture. The purpose of this test was to determine the horizontal flow characteristics of the mixture (i.e., flow to the convexical side). The specimens so-treated were also examined for fillet quality and found to be satisfactory in all cases. The results are also presented in the foregoing Table II.

*Example III.*—A brazing paste mixture was prepared using −200 mesh No. 470 flux binder, Mg 55% Zn 2% Al pellets as a filler, and mineral spirits as a carrier. The volume ratio of pellets to binder in the paste was 8 to 3. A number of horizontal flow specimens such as in Example II were prepared and brazed following generally the procedure as set forth in Example I. The pellet size distribution in the paste was varied from run to run. The results of these tests are presented in Table III below.

TABLE III

| Run No. | Pellet Size (U.S. Standard Sieve) Mesh | Brazing Results |
|---|---|---|
| 1 | +80 (Particles not passing though). | Makes coarse paste. |
| 2 | −80 +200 | Good paste—good fillets. |
| 3 | −200 +230 | Do. |
| 4 | −230 +270 | Do. |
| 5 | −270 +325 | Do. |
| 6 | −325 | Fillets a little small, but acceptable. |

Similar to the foregoing novel brazing paste mixtures may be prepared in varying ratios by parts by volume of the novel pelleted filler alloys of varying mesh size comprised of zinc Al and Mg, within the ranges hereinbefore specified, with other flux binders and carriers in order to produce brazing mixture in accordance with the present invention for use in dip brazing, which will also form high quality fillets.

Although the filler alloy of the present invention has been described for use primarily and preferably as pellets in a paste-like brazing mixture, it should be understood that the filler alloy may also be employed alone, that is, without the flux binder and carrier liquid, in dip brazing. Exemplary configurations to be employed include rod, shim stock, metal spray and the like. In such a case the alloy ordinarily would be applied to the joint to be brazed and the joint then immersed in the flux bath to perfect the joining operation.

It is manifest that the present invention may be changed or modified without departing from the spirit or scope thereof, and it is understood that I limit myself only as defined in the appended claims.

I claim:

1. A brazing mixture for joining magnesium base alloys consisting essentially of about 8 parts by volume of a pelleted filler alloy composition consisting essentially of from 1.5 to 2.5 weight percent aluminum, and from 52.5 to 57.5 weight percent zinc, the balance being magnesium, from about ¾ to about 6 parts by volume of a particulated flux binder, and an amount of a liquid carrier to provide a paste-like consistency when admixed with said binder and said pellets, said filler alloy pellets having a maximum size of about 60 mesh (U.S. Standard Sieve), the flux binder being a particulate flux material molten at magnesium brazing temperatures, said particulate flux having a maximum particle size of about 20 mesh, and said liquid carrier being substantially inert to said flux material and said pellets, and having a maximum boiling point of about 500° F.

2. The brazing mixture of claim 1 wherein the filler alloy pellets have a maximum size of about 80 mesh, and have the nominal composition of about 55% by weight zinc and about 2 percent by weight aluminum, the balance being substantially magnesium.

3. The brazing mixture of claim 1, wherein the particulate binder has a maximum size of about 60 mesh, and has a nominal composition by weight of about 55 percent KCl, about 34 percent $MgCl_2$, about 9 percent $BaCl_2$, and about 2 percent $CaF_2$.

4. The brazing mixture of claim 1 wherein the volume proportion of filler allow pellets-to-flux binder is about 8 to 3.

5. The brazing mixture of claim 1 wherein the liquid carrier is mineral spirits and wherein the amount of said carrier ranges from about 20 to about 35 percent, based on the combined weights of the alloy pellet-binder mixture.

6. A low melting brazing mixture for joining brazeable magnesium base alloys consisting essentially of about 8 parts by volume of a pelleted filler alloy composition consisting essentially of about 55 weight percent zinc, 2 weight percent aluminum, the balance being magnesium, about 3 parts by volume of a particulated flux binder having a maximum size of about 60 mesh and comprising nominally about 55 percent KCl, about 34 percent $MgCl_2$, about 9 percent $BaCl_2$, and about 2 percent $CaF_2$, and from 20 to 35 percent of a liquid carrier, based on the combined weight of the pellet and binder, sufficient to provide a paste consistency when admixed with said binder and said pellets.

References Cited by the Examiner

UNITED STATES PATENTS 3,108,369  10/1963  Koeplinger _____ 29—504 X

DAVID L. RECK, *Primary Examiner.*

H. F. SAITO, *Assistant Examiner.*